US012590268B1

(12) United States Patent
Steen

(10) Patent No.: US 12,590,268 B1
(45) Date of Patent: Mar. 31, 2026

(54) COMPOSITIONS COMPRISING RENEWABLE POLYASPARTIC ACID AND RELATED METHODS

(71) Applicant: LYGOS, Inc., Berkeley, CA (US)

(72) Inventor: Eric Steen, Hayward, CA (US)

(73) Assignee: Lygos, Inc., Hayward, CA (US)

( * ) Notice: Subject to any disclaimer, the term of this patent is extended or adjusted under 35 U.S.C. 154(b) by 269 days.

(21) Appl. No.: 18/135,942

(22) Filed: Apr. 18, 2023

Related U.S. Application Data

(60) Provisional application No. 63/332,586, filed on Apr. 19, 2022.

(51) Int. Cl.

| | |
|---|---|
| ***C11D 1/00*** | (2006.01) |
| *C05C 11/00* | (2006.01) |

(52) U.S. Cl.

CPC .............. *C11D 1/008* (2013.01); *C05C 11/00* (2013.01)

(58) Field of Classification Search

CPC ................................ C11D 1/008; C05C 11/00

USPC .......................................................... 510/276

See application file for complete search history.

(56) References Cited

U.S. PATENT DOCUMENTS

| | | | | |
|---|---|---|---|---|
| 5,057,597 | A | 10/1991 | Koskan | |
| 5,266,237 | A * | 11/1993 | Freeman | C11D 3/3719 510/351 |
| 5,847,013 | A | 12/1998 | Ross et al. | |
| 6,821,760 | B1 | 11/2004 | Mukouyama et al. | |
| 7,256,169 | B2 * | 8/2007 | Schimmel | C11D 11/0088 510/318 |
| 7,510,988 | B2 | 3/2009 | Wada et al. | |
| 7,696,401 | B2 | 4/2010 | Qin et al. | |
| 2003/0069153 | A1 * | 4/2003 | Jordan, IV | C08G 73/1092 510/276 |
| 2009/0176679 | A1 * | 7/2009 | McKee | C08G 73/1092 510/276 |
| 2018/0258437 | A1 | 9/2018 | Dietrich | |
| 2019/0136271 | A1 | 5/2019 | Minty et al. | |
| 2022/0119821 | A1 | 4/2022 | Dietrich et al. | |

FOREIGN PATENT DOCUMENTS

| | | | | |
|---|---|---|---|---|
| EP | 0581452 | A1 * | 2/1994 | C11D 3/0036 |
| WO | 2020/005834 | A1 | 1/2020 | |

OTHER PUBLICATIONS

Kokufuta et al., "Temperature Effect on the Molecular Weight and the Optical Purity of Anhydropolyaspartic Acid," Bulletin of the Chemical Society of Japan, 51(5):1555-1556 (1978).

* cited by examiner

*Primary Examiner* — Eisa B Elhilo

(74) *Attorney, Agent, or Firm* — Faegre Drinker Biddle & Reath LLP

(57) ABSTRACT

Provided herein are compositions and methods comprising polysuccinimides, polyaspartic acid and salts thereof, wherein the polysuccinimides, polyaspartic acid and salts thereof are of renewable or non-petrochemical origin.

6 Claims, No Drawings

COMPOSITIONS COMPRISING RENEWABLE POLYASPARTIC ACID AND RELATED METHODS

PRIORITY CLAIM

This application claims priority to U.S. provisional patent application No. 63/332,586 filed Apr. 19, 2022, the content of which is incorporated herein in its entirety by reference.

FIELD

Embodiments provided herein relate to compositions and methods comprising polysuccinimide, polyaspartic acid and salts thereof of renewable or non-petrochemical origin.

BACKGROUND

Polyaspartic acid is a water-soluble polymerized amino acid, which can be used as a biodegradable alternative to traditional polyanionic polymers, such as polyacrylic acid. Polyaspartic acid or salts thereof can act as a super-swelling material and thus be used in a variety of products including food packaging, diapers, and feminine hygiene products. Polyspartic acid or salts thereof can also be used as an anti-scalant agent in water desalination processes, waste water treatment operations, cooling water systems, and oil pipelines and fields. Polyaspartic acid or salts thereof can alternatively be used as a biodegradable detergent, dispersant, coating, thickener, binder, or fertilizer. Traditional polyanion materials, such as polyacrylic acid, are synthetic, petroleum-based products.

SUMMARY

The long-term economic and environmental concerns associated with the petrochemical industry have provided the impetus for the development and use of renewable chemicals (such as bio-based chemicals) that can be utilized instead of petroleum-derived chemicals. Recent development of biorefining processes which convert renewable feedstocks into bio-based materials can provide the reagents for producing renewable polyaspartic acid or salts thereof. As a more sustainable alternative to petrochemically-derived polyanionic polymers, there is a great need for biodegradable polysuccinimides and polyaspartic acids and salts and methods of making and using such renewable materials.

The present disclosure provides compositions and methods of using renewable polyaspartic acid or salts thereof, and/or polysuccinimide. These compositions are suitable as fertilizers, detergent anti-redeposition agents, detergent builders, detergent co-builders, growth promotion agents, tartar control agents, corrosion inhibition agents, as dispersants of clay, coal, minerals, pigments, and as scale inhibition agents for calcium, barium and strontium salts, dishwashing detergents, boiler and cooling water, and as reverse osmosis membranes, wherein the polyaspartic acid or salts thereof, and the polysuccinimide are of renewable or non-petrochemical origin.

In one aspect, provided herein are detergent formulations comprising an effective amount of polysuccinimide, polyaspartic acid or a salt thereof, wherein the polysuccinimide, polyaspartic acid or the salt thereof is of renewable or non-petrochemical origin. In one embodiment, provided herein are detergents comprising polysuccinimide, polyaspartic acid or a salt thereof with enhanced anti-encrustation, soil removal and anti-redeposition properties.

In some embodiments, the present disclosure provides a detergent composition comprising: from about 0.5 to about 50 percent by weight polysuccinimide, wherein the polysuccinimide is of renewable or non-petrochemical origin; up to about 50 percent by weight of one or more surfactants; and from 0.5 to about 85 percent by weight of one or more builders.

In some embodiments, the present disclosure provides a composition comprising: a water-insoluble slow-release nitrogen fertilizer; and polyaspartic acid or a salt thereof, wherein the composition comprises about 0.5% to 10% by weight of the polyaspartic acid or a salt thereof, based on the water-insoluble slow-release nitrogen fertilizer, and the polyaspartic acid is of renewable or non-petrochemical origin.

In another aspect, provided herein is a composition comprising a fertilizer and one or more of polysuccinimide, polyaspartic acid or a salt thereof, wherein the polysuccinimide or polyaspartic acid is of renewable or non-petrochemical origin.

In some embodiments, the present disclosure provides a method of formulating a detergent composition comprising: adding polysuccinimide to a level of from 0.5 to about 50 percent by weight of the detergent composition, wherein the polysuccinimide is of renewable or non-petrochemical origin.

In another aspect, provided herein are methods of enhancing plant productivity, demonstrated for example, and without limitation, by increased growth rate, increased biomass, higher yields and quality (protein content), accelerated rate of root formation, increased tillering, increased chlorophyll concentration and the likes, comprising applying to the plant, polysuccinimide, or polyaspartic acid or a salt thereof that is water soluble and not absorbed into a plant. In some embodiments, the polysuccinimide, polyaspartic acid or the salt thereof has a weight average molecular weight ($M_w$) larger than 1,500.

In some embodiments, the present disclosure provides a seed, at least a portion of which is coated with a composition comprising: a fertilizer; and polyaspartic acid or a salt thereof, wherein the composition comprises about 0.5% to 10% by weight of polyaspartic acid or a salt thereof, based on the fertilizer, and the polyaspartic acid is of renewable or non-petrochemical origin.

In some embodiments, the present disclosure provides a plant at least a portion of which is coated with a composition comprising: a fertilizer; and polyaspartic acid or a salt thereof, wherein the composition comprises about 0.5% to 10% by weight of polyaspartic acid or a salt thereof, based on the urea formaldehyde, and the polyaspartic acid is of renewable or non-petrochemical origin.

In some embodiments, the present disclosure provides a method for enhancing uptake of the nutrients N, P and K in a plant, such as a woody perennial. In some embodiments, the method comprises providing a fertilizer composition comprising a fertilizer and polyaspartic acid or a salt, wherein the effective percentages of the nutrients N, P and K are present in the ranges between about 25% to 32% for nitrogen, about 17% to 8% phosphorus expressed as $P_2O_5$, and about 12% to 5% soluble potash expressed as $K_2O$. In some embodiments, the method further includes treating the plant with the fertilizer composition.

In some embodiments, the present disclosure provides a method for enhancing uptake and utilization of plant growth nutrients. In some embodiments, the method comprises supplying to a plant a polyaspartic acid or a salt thereof or a polysuccinimide, wherein the polyaspartic acid or polysuccinimide is of renewable or non-petrochemical origin. In some embodiments, the polyaspartic acid or polysuccinimide has a weight average molecular weight (Mw) larger than 1500.

In another aspect, provided herein are methods of producing super absorbing polymeric networks that are biodegradable, comprising chemically modifying polysuccinimide which is of renewable and non-petrochemical origin.

In some embodiments, the present disclosure provides a super absorbing polymeric network of polyaspartic acid or a salt thereof comprising a copolymer comprised of succinimide units, dimeric aspartamide units, and less than about 20% aspartate units in alpha form, beta form or both.

In some embodiments, the present disclosure provides a method of producing a polymeric network comprising cross-linked polyaspartic acid or a salt thereof. In some embodiments, the method comprises the steps of: a) dissolving a polysuccinimide in a polar aprotic organic solvent, wherein the polysuccinimide is of renewable or non-petrochemical origin; b) reacting the dissolved polysuccinimide with an effective crosslinking amount of an organic crosslinking agent that is an organic base containing at least two primary amine groups to form a crosslinked polysuccinimide product in the resulting reaction mixture; c) isolating the crosslinked polysuccinimide product obtained by admixing the reaction mixture with a solvent in which the polar aprotic organic solvent is soluble and the crosslinked polysuccinimide product is not; d) recovering the crosslinked polysuccinimide product; and e) hydrolyzing the recovered crosslinked polysuccinimide product to produce a polymeric network of polyaspartic acid or a salt thereof.

In another aspect, provided herein are compositions and methods comprising polysuccinimide, polyaspartic acid, or a salt thereof, as scale inhibitors and as corrosion inhibitors, wherein polysuccinimide, polyaspartic acid, or the salt thereof is of renewable and non-petrochemical origin.

In another aspect, provided herein are methods and compositions for inhibiting or eliminating sodium chloride precipitation from brine used in oil fields, and/or scale formation in oil filed pipes that are in contact with aqueous fluids.

In some embodiments, the present disclosure provides a method for reducing a volume of water injected into an existing subterranean well during hydrocarbon production for sodium chloride inhibition. In some embodiments, the method comprises the steps of: a) pumping a formation fluid including a hydrocarbon and a produced water from the subterranean well wherein the subterranean well includes a brine including sodium chloride; b) adding a flow of treatment water to the subterranean well at a first ratio of treatment water to produced water; c) adding an aspartic acid-based polymer from a storage tank to a mixing location to be mixed with the treatment water, wherein the aspartic acid-based polymer is of renewable or non-petrochemical origin; d) pumping the aspartic acid-based polymer and the treatment water mixture from the mixing location to the subterranean well at a second ratio of treatment water to produced water, wherein the second ratio is less than the first ratio in order to reduce a total volume pumped into subterranean well; and e) monitoring an ion concentration of the produced water; wherein the produced water is a combination of a brine including sodium chloride and the aspartic acid-based polymer and treatment water mixture, wherein the aspartic acid-based polymer inhibits crystallization of sodium chloride from the brine.

In some embodiments, the present disclosure provides a method for inhibiting scale formation in an existing subterranean well during hydrocarbon production. In some embodiments, the method comprises the steps of: a) pumping treatment water to a mixing location; b) mixing an aspartic acid-based polymer into the treatment water at the mixing location wherein the aspartic acid-based polymer is of renewable or non-petrochemical origin; c) pumping the mixed treatment water and aspartic acid-based polymer to the subterranean well at a first specified rate; d) adjusting a rate of injection of the treatment water into the subterranean well to a second rate of injection, wherein the second rate of injection is less than a first rate of injection such that a smaller volume of water is injected into the subterranean well in order to reduce a total volume pumped into subterranean well; e) monitoring an ion concentration of the produced water; and f) adjusting a concentration of the aspartic acid-based polymer in the treatment water based at least in part on the ion concentration of the produced waters, wherein the aspartic acid-based polymer inhibits crystallization of sodium chloride in the subterranean well.

In some embodiments, the present disclosure provides a method of treating a subterranean formation penetrated by a wellbore. In some embodiments, the method comprises the steps of: a) forming a treatment fluid comprising an aqueous carrier fluid, a proppant and a water-insoluble solid-form polysuccinimide homopolymer or copolymer capable of hydrolyzing to form polyaspartate and/or polyaspartic acids, wherein the polysuccinimide is of renewable or non-petrochemical origin; b) introducing the treatment fluid into the formation through the wellbore; c) allowing the polysuccinimide to hydrolyze over time and become water-soluble; and providing scale inhibition over time in formation and within proppant.

In some embodiments, the present disclosure provides a system for minimizing scale formation in an existing subterranean well during hydrocarbon production. In some embodiments, the system comprises: a treatment water storage tank including a sensor for measuring an ion concentration of the treatment water in the water storage tank; a storage tank including an aspartic acid-based polymer wherein the aspartic acid-based polymer is of renewable or non-petrochemical origin; a mixing location configured to mix the treatment water and the aspartic acid-based polymer at a specified concentration, wherein the mixed treatment water and aspartic acid-based polymer are provided to the subterranean well to at least partially inhibit sodium chloride crystallization within the subterranean well; a produced water storage tank including a sensor for measuring an ion concentration of a produced water in the produced water storage tank; and a controller configured to control a rate of flow of the treatment water to the subterranean well such that a total volume of treatment water provided to the subterranean well is reduced over a period of time.

In some embodiments, the present disclosure provides s method for comminuting an aqueous suspension of coarse mineral material. In some embodiments, the method comprises the steps of: (a) preparing an aqueous suspension containing a coarse mineral material and a milling agent, wherein the milling agent comprises a salt of polyaspartic acid of renewable or non-petrochemical origin, preferably having a weight average molecular weight of 35,000 to 25,000; (b) adding a milling body to the aqueous suspension, thereby preparing a mixture; and (c) milling the mixture to obtain particles having a median diameter preferably less than 1 micron.

In some embodiments, the present disclosure provides a method of treating a sandstone-containing formation penetrated by a wellbore. In some embodiments, the method comprises the steps of: (a) forming a treatment fluid comprising an aqueous solution containing a hydrogen fluoride source, ammonium hydroxide and at least one of a polysuccinimide and a polyaspartic acid or a salt thereof, wherein the polysuccinimide and the polyaspartic acid are of renewable non-petrochemical origin; wherein the ammonium hydroxide and the polysuccinimide are mixed together prior to addition of the hydrogen fluoride source to facilitate degradation of at least one of polysuccinimide, polyaspartic acid, or salt thereof, to form an aqueous polycarboxylate solution, the treatment fluid comprising the aqueous polycarboxylate solution and the hydrogen fluoride source; and (b) introducing the treatment fluid into the formation through the wellbore.

DETAILED DESCRIPTION

This detailed description contains parts under separate headings, which merely assist a reader. Accordingly, as would be apparent to the skilled artisan, disclosure in any part can be relevant to disclosure in any other part.

Definitions

As used in the specification and claims, the singular form "a," "an" and "the" include plural references unless the context clearly dictates otherwise.

All numerical designations, for example, pH, temperature, time, concentration, and molecular weight, including ranges, are approximations which are varied (+) or (−) by increments of 1, 5, or 10%, for example, by using the prefix, "about." It is to be understood, although not always explicitly stated that all numerical designations are preceded by the term "about." It also is to be understood, although not always explicitly stated, that the reagents described herein are merely examples and that equivalents of such are known in the art.

A "salt" is derived from a variety of organic and inorganic counter ions well known in the art and include, when the compound contains an acidic functionality, by way of example only, sodium, potassium, calcium, magnesium, ammonium, and tetraalkylammonium; and when the molecule contains a basic functionality, salts of organic or inorganic acids, such as hydrochloride, hydrobromide, tartrate, mesylate, acetate, maleate, and oxalate. Salts include acid addition salts formed with inorganic acids or organic acids. Inorganic acids suitable for forming acid addition salts include, by way of example and not limitation, hydrohalide acids (for example, hydrochloric acid, hydrobromic acid, hydroiodic acid, etc.), sulfuric acid, nitric acid, phosphoric acid, and the like.

Organic acids suitable for forming acid addition salts include, by way of example and not limitation, acetic acid, trifluoroacetic acid, propionic acid, hexanoic acid, cyclopentanepropionic acid, glycolic acid, oxalic acid, pyruvic acid, lactic acid, malonic acid, succinic acid, malic acid, maleic acid, fumaric acid, tartaric acid, citric acid, palmitic acid, benzoic acid, 3-(4-hydroxybenzoyl) benzoic acid, cinnamic acid, mandelic acid, alkylsulfonic acids (for example, methanesulfonic acid, ethanesulfonic acid, 1,2-ethane-disulfonic acid, 2-hydroxyethanesulfonic acid, etc.), arylsulfonic acids (for example, benzenesulfonic acid, 4-chlorobenzenesulfonic acid, 2-naphthalenesulfonic acid, 4-toluenesulfonic acid, camphorsulfonic acid, etc.), glutamic acid, hydroxynaphthoic-acid, salicylic acid, stearic acid, muconic acid, and the like.

Salts also include salts formed when an acidic proton present in the parent compound is either replaced by a metal ion (for example, an alkali metal ion, an alkaline earth metal ion, or an aluminum ion) or by an ammonium ion (for example, an ammonium ion derived from an organic base, such as, ethanolamine, diethanolamine, triethanolamine, morpholine, piperidine, dimethylamine, diethylamine, triethylamine, and ammonia).

The term "polymeric networks" as used herein refers to random copolymers of crosslinked polyaspartic acid or a salt thereof which can swell or gel in water or saline solutions.

The term "super absorbing polymeric networks" and grammatical variations thereof as used herein refer to polymeric networks of polyaspartic acid or salts thereof (polyaspartates) which can absorb from at least 3 times to more than 90 times their weight in water and from at least 2 times to more than 20 times their weight in aqueous 1% sodium chloride (saline solution).

The terms "bio-based" or "non-petrochemically derived" or "renewable" as used herein refer to an organic compound that is synthesized from biologically produced organic components by fermenting a microorganism. These compounds are distinguished from wholly petroleum-derived compounds or those entirely of fossil origin. A compound of renewable or non-petrochemical origin include carbon atoms that have a non-petrochemical origin. Such non-petrochemical (or bio based or renewable) compounds have a $^{14}C$ amount substantially higher than zero, such as about 1 parts per trillion or more, because they are derived from photosynthesis based starting material, such as for example, glucose or another feedstock used in producing such a compound, such as aspartic acid. In some embodiments, non-petrochemical origin-polysuccinimide or a hydrolyzed product thereof such as poly aspartic acid or a salt thereof provided and utilized herein contain a $^{14}C$ amount substantially higher than zero, such as about 0.5 or 1 parts per trillion or more.

Polyaspartic Acid

Polysuccinimide is a polymer of formula:

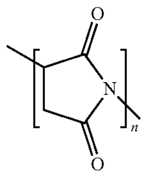

Polysuccinimide can be prepared by heating aspartic acid. E.g, and without limitation, polysuccinimide can be prepared by thermal polycondensation of aspartic acid as disclosed in Kokufuta et al., "Temperature Effect on the Molecular Weight and the Optical Purity of Anhydropoly-aspartic Acid," Bul. Chem. Soc. Japan, 51(5):1555-1556 (1978). See also, U.S. Pat. No. 5,057,597.

In some embodiments, polysuccinimide can be hydrolyzed to polyaspartic acid or a salt thereof. Polyaspartic acid is a random polyamide polymer of aspartic acid containing alpha (as is alpha amino acids) and beta (as in beta amino acids) amide links. E.g, and without limitation, polyaspartic acid sodium salt can be illustrated as a compound of formula:

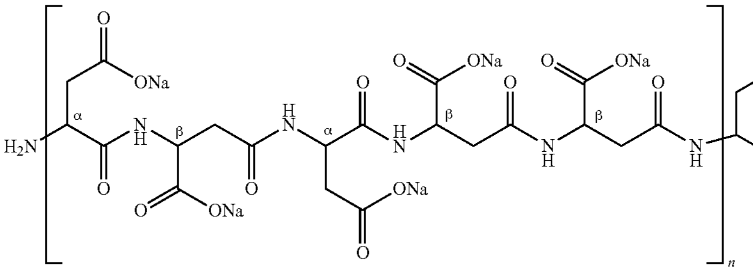

Aspartic acid can be prepared by fermentation employing a recombinant microorganism. A suitable microorganism includes *Corneybacterieum glutamicum*. See, e.g., PCT App. Pub. No. WO 2020/005834, incorporated herein by reference. See also, US Pat. App. Pub. No. US 20180258437, incorporated herein by reference. L-aspartic acid or a salt thereof can be prepared, e.g., and without limitation by a process disclosed in US patent application number US 2022/0119821, which is incorporated herein in its entirety by reference, or by enzymatic amination of fumaric acid or a salt thereof. See, e.g., U.S. Pat. No. 6,821,760, which is incorporated herein in its entirety by reference. Polymers of aspartic acids are prepared e.g. and without limitation by thermal polymerization of aspartic acid, without or with acid catalysis; reaction of maleic acid, maleic anhydride, or fumaric acid with ammonia such as aqueous ammonia; and the likes. Polymers of glutamic acid can be prepared e.g. by a process disclosed in US 2019/0136271, which is incorporated herein in its entirety by reference. Crosslinked poly amino acids, such as polyaspatic acids, can be prepared, e.g., and without limitation by known processes and can be adapted herein by a person skilled in the art. See, e.g., U.S. Pat. No. 5,847,013, which is incorporated herein in its entirety by reference. Alternatively, in some embodiments, maleic acid or fumaric acid can be converted enzymatically to polyaspartic acid. In some embodiments, the maleic acid is bio-based. In some embodiments, the fumaric acid is bio-based. A product for absorption of bodily fluid comprising a superabsorbent, and methods for testing the same, are known to one of skilled in the art and can be adapted and modified by a person skilled in the art following this disclosure. See, e.g., U.S. Pat. Nos. 7,510,988 and 7,696,401, each of which is incorporated herein in its entirety by reference.

Detergents

In one aspect, provided herein is a detergent formulation with enhanced performance, wherein the formulation comprises an effective amount of polysuccinimide, polyaspartic acid or a salt thereof, wherein the polysuccinimide, polyaspartic acid or a salt thereof is of renewable or non-petrochemical origin. In one aspect, provided herein are detergents with enhanced anti-encrustation, soil removal and anti-redeposition properties. In another aspect, provided herein is a detergent additive which is formulated as a solid. Formulating detergents with polysuccinimide enhances soil removal and anti-redeposition properties of the detergent. Polysuccinimide, which is a granular solid, is formulated into granular or powdered detergent compositions.

In some embodiments, polysuccinimides utilized herein have weight average molecular weights ($M_w$) of from about 1,000 to about 30,000, preferably from about 1,500 to about 10,000 and most preferably from about 2,000 to about 7,000 as measured by aqueous gel permeation chromatography (GPC), and can be prepared by techniques well known to those skilled in the art.

The detergent formulations to which the polysuccinimide may be added are any of those typically available. Detergent formulations include laundry detergent formulations and automatic machine dishwashing detergent formulations. These formulations generally contain builders, and may also contain co-builders, surfactants, buffering agents, bleaches, enzymes, stabilizers, perfumes, whiteners, softeners, preservatives, and water.

As used herein, builders generally refer to materials added to a detergent to improve its cleaning properties through increasing the removal of soil and/or preventing or minimizing the redeposition of soil. In some embodiments, builders enhance surfactant performance. In some embodiments, builders provide an alkaline environment. In some embodiments, builders improve the wetting and emulsification characteristics of a detergent. In some embodiments, builders desorb soil. In some embodiments, builders remove or sequester $Ca_2$+ and/or $Mg_2$+ ions from the wash water and/or soiled wash load. In some embodiments, builders are organic, inorganic, or a combination thereof. Examples of builders include but are not limited to sodium carbonate (soda ash), sodium pyrophosphate, trisodium phosphate, sodium tripolyphosphate, sodium sulfate, borax, polycarboxylates (for example, ethylenediaminetetraacetic acid (EDTA) and nitrilotriacetic acid (NTA)), citrates (trisodium citrate), silicates (for example, sodium silicate, crystalline sodium disilicate, and zeolite), aminocarboxylates (for example, methylglycindiacetic acid), glutaminic acid, gluconic acid, polyacrylic acid, and diacetic acid. As used herein, co-builders generally refer to materials added to a detergent to inhibit crystal growth and/or disperse soil/dirt particles. Examples of co-builders include but are not limited to carboxylates (for example, di-carboxylic acid and di-sodium oxalate), polycarboxylates (for example, poly (sodium carboxylate)), oxalic acid, citrates, carboxymethyl inulin, and polyphosphonates.

In one aspect, provided herein is a detergent composition comprising: a) from 0.5 to about 50 percent by weight polysuccinimide, wherein the polysuccinimide is of renewable or non-petrochemical origin; b) from 0 to about 50 percent by weight of one or more surfactants; and in addition to the polysuccinimide, c) from 0.5 to about 85 percent by weight of one or more builders.

In some embodiments, the polysuccinimide may be incorporated into a detergent formulation at levels where they provide the intended benefit. In some embodiments, this level will be from 0.5 to about 50 percent, preferably from about 1 to about 30 percent by weight of polysuccinimide solids based on the total detergent formulation. In one embodiment, the surfactant is present at a level of from about 5 to about 45 percent by weight. In another embodiment, the polysuccinimide is present at a level of from about 1 to about 30 percent by weight. In another embodiment, the polysuccinimide is present at a level of from about 1 to about 30 percent by weight.

In another aspect, provided herein is a method of formulating a detergent composition comprising: adding polysuccinimide to a level of from 0.5 to about 50 percent by weight of the detergent composition, wherein the polysuccinimide is of renewable or non-petrochemical origin. In one embodiment, polysuccinimide is added to a level of from about 1 to about 30 percent by weight of the detergent composition.

Fertilizers, Seed Coatings and Plant Growth Enhancers

In another aspect, provided herein is a composition comprising a fertilizer and one or more of polysuccinimide, polyaspartic acid or a salt thereof, wherein the polysuccinimide or polyaspartic acid is of renewable or non-petrochemical origin. In another aspect, provided herein is a fertilizing composition comprising: a water-insoluble slow-release nitrogen fertilizer; and polyaspartic acid or a salt thereof preferably, about 0.5% to 10% by weight of the polyaspartic acid or a salt thereof, based on the water-insoluble slow-release nitrogen fertilizer, wherein the polyaspartic acid is of renewable or non-petrochemical origin.

In one embodiment, the water-insoluble slow-release nitrogen fertilizer is a water-insoluble reacted nitrogen fertilizer. In another embodiment, the water-insoluble reacted nitrogen fertilizer is methylene urea or isobutylidene diurea. In another embodiment, the water-insoluble slow-release nitrogen fertilizer is methylene urea. In another embodiment, the water-insoluble slow-release nitrogen fertilizer is isobutylidene diurea. In another embodiment, the water-insoluble slow-release nitrogen fertilizer is urea formaldehyde.

In another embodiment, the polyaspartic acid or a salt thereof has a weight average molecular weight of greater than 1,000 to about 20,000. In another embodiment, the polyaspartic acid or a salt thereof has a weight average molecular weight of about 1,500 to about 10,000. In another embodiment, the polyaspartic acid or a salt thereof has a weight average molecular weight of about 8,000.

In another embodiment, the fertilizing composition comprises about 1% to 5% by weight of the polyaspartic acid or a salt thereof based on the water-insoluble slow-release nitrogen fertilizer. In another embodiment, the fertilizing composition comprises about 3% by weight polyaspartate based on the water-insoluble slow-release nitrogen fertilizer.

In another embodiment, the water-insoluble nitrogen fertilizer comprises about 1% to 50% by weight nitrogen. In another embodiment, the water-insoluble nitrogen fertilizer comprises about 1% to 36% by weight nitrogen. In another embodiment, the water-insoluble nitrogen fertilizer comprises about 5% to 50% by weight nitrogen.

In another embodiment, the fertilizing composition further comprises a pesticide. In another embodiment, the pesticide is an insecticide, an herbicide, a fungicide or a plant growth regulator.

In another embodiment, the fertilizing composition coating the seed comprises about 0.5% to 10% by weight of polyaspartic acid or a salt thereof, based on the fertilizer. In another embodiment, the fertilizing composition coating at least a portion of the plant comprises about 0.5% to 10% by weight of polyaspartic acid or a salt thereof, based on the urea formaldehyde. In another embodiment, the portion of the plant coated with the composition is at least a portion of the roots of the plant.

In another embodiment, provided herein is a seed comprising a coating of the fertilizing composition provided herein on at least a portion of the surface of the seed. In another embodiment, provided herein is a plant having a root system comprising the fertilizing composition provided herein on at least a portion of the roots of the plant.

In another aspect, provided herein are fertilizer blends comprising polysuccinimide, a polyaspartic acid or a salt thereof, wherein the polysuccinimide or polyaspartic acid is of renewable or non-petrochemical origin. The inclusion of polyaspartic acid enhances the effect of nutrients both in fertilizers and in the soil. Affected nutrients include the macronutrients nitrogen, phosphorus, potassium, calcium and magnesium. Furthermore, without being bound by theory, polyaspartic acids have a chelating effect on micronutrients such as zinc, improving the absorption and transportation inside the plant. The inclusion of polyaspartic acids can also increase root branching and root hair development. Moreover, polyaspartic acids can directly or indirectly influence the physiological activities of the plant. For example, the application of polyaspartic acids before, during and after stress conditions such as high temperatures, drought and pest attack, can help ameliorate stress physiology, thus having a preventing and recovering affect.

In one aspect, provided herein is a method for enhancing uptake of the nutrients N, P and K in a plant, such as a woody perennial, comprising: a) providing a fertilizer composition comprising a fertilizer and polyaspartic acid or a salt, preferably potassium polyaspartate, wherein the effective percentages of the nutrients N, P and K are present in the ranges between about 25% to 32% for nitrogen, about 17% to 8% phosphorus expressed as $P_2O_5$, and about 12% to 5% soluble potash expressed as $K_2O$; and b) treating the plant with the fertilizer composition.

In one embodiment, the fertilizer composition comprises from about 0.25% to about 2.5% by weight potassium polyaspartate. In another embodiment, the fertilizer composition comprises from about 0.3% to about 1.0% potassium polyaspartate. In another embodiment, the ratio of N, P and K is about 3:1:1. In another embodiment, the step of providing a dry high analysis fertilizer composition comprises: preparing a preblend of ureaformaldehyde and potassium polyaspartate. In another embodiment, the fertilizer composition has a salt index of less than 10.

In another aspect, provided herein are uses of polysuccinimide, or polyaspartic acid or a salt thereof that is water soluble and not absorbed into a plant, for example and without limitation, having a weight average molecular weight ($M_w$) larger than 1500, as plant productivity enhancers as demonstrated by increased growth rate, increased biomass, higher yields and quality (protein content), accelerated rate of root formation, increased tillering, increased chlorophyll concentration and the like indicia. Without being bound by theory, such beneficial effects are achieved by more efficient nutrient utilization by making available to the plant a higher level of plant food nutrients in the root feeding zone or through absorption and translocation through foliar mechanisms. The polyaspartic acid can be supplied to the plant directly or as a polysuccinimide which hydrolyzes in situ to polyaspartic acid or a salt thereof.

In some embodiments, the polyaspartic acid or a salt thereof or polysuccinimide is applied alone or in combination with other polymers, for example, polylactic acid, polyglycolic acid and the like, and other water-soluble polycarboxylates.

In another aspect, provided herein is a method for enhancing a more efficient uptake and utilization of plant growth nutrients by supplying to the plant a polyaspartic acid or a salt thereof or a polysuccinimide, wherein the polyaspartic acid or polysuccinimide is of renewable or non-petrochemical origin, and preferably has a weight average molecular weight (Mw) larger than 1500.

In one embodiment, the polyaspartic acid has a weight average molecular weight (Mw) within the range of 2000-100,000. In another embodiment, the polyaspartic acid has a weight average molecular weight (Mw) within the range of 3000-5000.

Water Swellable Polymers

In another aspect, provided herein are methods of producing super absorbing polymeric networks that are biodegradable. In some embodiments, these networks are produced by chemically modifying polysuccinimide, which is of renewable or non-petrochemical origin.

In one embodiment, a method comprises reacting polysuccinimide with an organic crosslinking agent that is an organic base comprising at least two primary amine groups in an amount sufficient to form crosslinked polysuccinimide. The crosslinked polysuccinimide is subsequently hydrolyzed with base to form a crosslinked polymeric network of polyaspartate. In another embodiment, polysuccinimide is first reacted with an organic crosslinking agent in a polar aprotic solvent to crosslink polysuccinimide. The crosslinked polysuccinimide is then collected for subsequent hydrolysis to produce a super absorbing polymeric network of polyaspartate.

Super absorbing polymeric networks can be prepared in a single reaction vessel, according to some methods provided herein, using aqueous media. In one embodiment, polysuccinimide is crosslinked in an aqueous reaction mixture containing an effective crosslinking amount of organic crosslinking agent or salt thereof from which free organic crosslinking agent can be released by base hydrolysis to produce crosslinked polysuccinimide. The crosslinked polysuccinimide product can then be further base hydrolyzed to produce a polymeric network of polyaspartate.

The polymeric networks provided herein are useful in a wide variety of applications, where liquid absorption, viscosity modification, chemical sequestration or dehydration is desired. For example, applications include the use of polymeric networks as super absorbents in diapers, incontinence products and sanitary napkins; as humectants in agricultural products; as sludge coagulants in water treatment; as viscosity modifiers in the petroleum industry; as dehydrating agents; as chemical absorbents (for example for clean-up of chemical spills); for controlled release of chemicals; for microencapsulation; as thickening agents; as media for electrophoresis and chromatography (for example for gel permeation chromatography, capillary electrophoresis, etc.); in soft contact lens manufacture; and as moisturizing components in consumer products, such as personal care products or the like.

In another aspect, provided herein is a method of producing polymeric networks comprising crosslinked polyaspartic acid or a salt thereof comprising the steps of: a) dissolving a polysuccinimide in a polar aprotic organic solvent, wherein the polysuccinimide is of renewable or non-petrochemical origin; b) reacting the dissolved polysuccinimide with an effective crosslinking amount of an organic crosslinking agent that is an organic base containing at least two primary amine groups to form a crosslinked polysuccinimide product in the resulting reaction mixture; c) isolating the crosslinked polysuccinimide product obtained by admixing the reaction mixture with a solvent in which the polar aprotic organic solvent is soluble and the crosslinked polysuccinimide product is not; d) recovering the crosslinked polysuccinimide product; and e) hydrolyzing the recovered crosslinked polysuccinimide product to produce a polymeric network of polyaspartic acid or a salt thereof.

In one embodiment, the reaction mixture in step (b) is heated to a temperature range of from about 25° C. to about 60° C. and maintained at the temperature range until the crosslinked polysuccinimide product forms. In another embodiment, the method further comprises the step of cooling the reaction mixture to ambient room temperature between step (b) and step (c). In another embodiment, the crosslinked polysuccinimide is collected in step (d) by filtering and drying the crosslinked polysuccinimide. In another embodiment, the method further comprises the step of collecting the polymeric network of polyaspartic acid or a salt thereof. In another embodiment, the method further comprises the step of substantially drying the polymeric network. In another embodiment, the polymeric network of polyaspartic acid or a salt thereof is in the form of a gel or solid. In another embodiment, the polysuccinimide in step (a) has an average molecular weight in the range of from about 500 to greater than about 100,000. In another embodiment, the amount of organic crosslinking agent based on moles of diamine per mole of succinimide monomer units in the polysuccinimide is present in a mol % amount of about 0.1 to about 50. In another embodiment, the polysuccinimide in step (a) has a weight average molecular weight in the range of from about 500 to greater than about 100,000 and the organic crosslinking agent based on moles diamine per mole of succinimide monomer units in the polysuccinimide is present in a mol % amount of about 0.1 to about 50.

Water Treatment

Provided herein are compositions comprising polysuccinimide, polyaspartic acid, or a salt thereof, as scale inhibitors and as corrosion inhibitors, wherein the polysuccinimide, polyaspartic acid, or the salt thereof is of renewable or non-petrochemical origin. Areas of application of such compositions can be, for example: water treatment (for example treatment of cooling waters, process waters, gas scrubbing waters, injection waters in secondary oil recovery and water treatment in mining) and industrial and institutional cleaning applications (for example cleaning of vessels and equipment in the food industry, bottle washing, for institutional dishwashers and washing agents).

Also provided herein is a method for water treatment, wherein the composition for water treatment provided herein is introduced into the water to be treated. Further provided herein is a method for alkaline cleaning, characterized in that the composition according to the disclosure is used as an encrustation inhibitor/sequestrant. For example, the compositions according to the disclosure are added to the feed water in concentrations between about 0.1 and 10 mg/l of active compound to prevent encrustations and scale during use in cooling systems with fresh water cooling.

In the cooling circuits, the metering of the additives to prevent scale and/or corrosion is frequently rate-dependent based on the make-up water. The concentrations are between about 1 and 50 mg/l of active compounds in the circulating cooling water.

In sea water desalination by distillation in MSF (multistage flash) and VP (vapour compression) plants, encrustations on the heat exchange surfaces are prevented by additive additions of about 1 to 5 mg/l of active compounds to the feed sea water.

The dosages in RO (reverse osmosis) plants are generally markedly lower because of the process-related lower maximum temperatures.

Inhibition of Scale Formation in Pipes or Oil Wells

Scale refers to calcium and barium salts such as $CaCO_3$, $CaSO_4$, calcium phosphates, $BaSO_4$, and such other water insoluble metal salts, which precipitate, for example, inside a pipe carrying an aqueous fluid, impede or block the fluid flow, and disrupt the desired functioning of the fluid flow. Scale formation is problematic in oil fields. In some embodiments, provided herein is a composition comprising polysuccinimide, polyaspartic acid, or a salt thereof, for inhibiting and/or removing scale formation, wherein the polysuccinimide, polyaspartic acid, or the salt thereof is of renewable or non-petrochemical origin. In another aspect, provided herein is a method of inhibiting, reducing, or removing scale formation from an aqueous fluid, comprising admixing a composition comprising polysuccinimide, polyaspartic acid, or a salt thereof and the aqueous fluid, and thereby inhibiting, reducing, and/or removing scale formation. The scale inhibiting, reducing, or removing compositions and methods provided herein are useful in oil fields, for example, with respect to oil field pipes carrying aqueous fluids.

In one aspect, provided herein is a method for inhibiting scale formation in an existing subterranean well during hydrocarbon production, the method comprising: pumping treatment water to a mixing location; mixing an aspartic acid-based polymer into the treatment water at the mixing location wherein the aspartic acid based polymer is of renewable or non-petrochemical origin; pumping the mixed treatment water and aspartic acid-based polymer to the subterranean well at a first specified rate; adjusting a rate of injection of the treatment water into the subterranean well to a second rate of injection, wherein the second rate of injection is less than a first rate of injection such that a smaller volume of water is injected into the subterranean well in order to reduce a total volume pumped into subterranean well; and monitoring an ion concentration of the produced water; and adjusting a concentration of the aspartic acid-based polymer in the treatment water based at least in part on the ion concentration of the produced waters. wherein the aspartic acid-based polymer inhibits crystallization of sodium chloride in the subterranean well.

In one embodiment, the aspartic acid-based polymer is provided to the subterranean well with the treatment water at a concentration between 1 part per million (ppm) and 1000 ppm. In another embodiment, the aspartic acid-based polymer is provided into the subterranean well at a rate that results in a specified concentration of the aspartic acid-based polymer in the treatment water between about 25 parts per million (ppm) and 500 ppm. In another embodiment, the method comprises inhibiting at least one of a calcium carbonate scale formation or a barium sulfate scale formation. In another embodiment, the method further comprises inhibiting sodium chloride scale within a formation matrix associated with the subterranean well and/or on equipment associated with the subterranean well. In another embodiment, the aspartic acid-based polymer is polysuccinimide and/or a derivative of polysuccinimide.

In another aspect, provided herein is a system for minimizing scale formation in an existing subterranean well during hydrocarbon production, the system comprising: a treatment water storage tank including a sensor for measuring an ion concentration of the treatment water in the water storage tank; a storage tank including an aspartic acid-based polymer wherein the aspartic acid based polymer is of renewable or non-petrochemical origin; a mixing location configured to mix the treatment water and the aspartic acid based polymer at a specified concentration, wherein the mixed treatment water and aspartic acid based polymer are provided to the subterranean well to at least partially inhibit sodium chloride crystallization within the subterranean well; a produced water storage tank including a sensor for measuring an ion concentration of a produced water in the produced water storage tank; and a controller configured to control a rate of flow of the treatment water to the subterranean well such that a total volume of treatment water provided to the subterranean well is reduced over a period of time.

In another aspect, provided herein is a method for reducing a volume of water injected into an existing subterranean well during hydrocarbon production for sodium chloride inhibition, the method comprising: pumping a formation fluid including a hydrocarbon and a produced water from the subterranean well wherein the subterranean well includes a brine including sodium chloride; adding a flow of treatment water to the subterranean well at a first ratio of treatment water to produced water; adding an aspartic acid-based polymer from a storage tank to a mixing location to be mixed with the treatment water, wherein the aspartic acid based polymer is of renewable or non-petrochemical origin; pumping the aspartic acid-based polymer and the treatment water mixture from the mixing location to the subterranean well at a second ratio of treatment water to produced water, wherein the second ratio is less than the first ratio in order to reduce a total volume pumped into subterranean well; and monitoring an ion concentration of the produced water; wherein the produced water is a combination of a brine including sodium chloride and the aspartic acid-based polymer and treatment water mixture, wherein the aspartic acid-based polymer inhibits crystallization of sodium chloride from the brine.

In one embodiment, the aspartic acid-based polymer includes one or more of a copolymer of the aspartic acid-based polymer, a terpolymer of the aspartic acid-based polymer, an aspartic acid-based polymer derivative, an aspartic acid-based polymer having an end cap, and a soluble salt of the aspartic acid-based polymer. In another embodiment, the aspartic acid-based polymer is polysuccinimide and/or a derivative of polysuccinimide. In another embodiment, the aspartic acid-based polymer is made from at least one dibasic acid. In another embodiment, the at least one dibasic acid is at least one of L-aspartic acid, maleic anhydride, fumaric acid, glutamic acid, gluataric acid, adipic acid, succinic acid, tartaric acid, malic acid, maleamic acid, and/or maleic acid. In another embodiment, the aspartic acid-based polymer is a polyaspartic acid sodium salt.

In another aspect, provided herein is a method of treating a subterranean formation penetrated by a wellbore is carried out by forming a treatment fluid comprising an aqueous carrier fluid and a solid-form polysuccinimide homopolymer or copolymer capable of hydrolyzing to form polyaspartic acid or a salt thereof, wherein the polysuccinimide is of renewable or non-petrochemical origin. The treatment fluid is introduced into the formation through the wellbore. In certain embodiments, the treatment fluid may contain a proppant and may include a viscosifying agent. In some embodiments, the treatment fluid may further contain a formation-dissolving agent capable of dissolving materials of the formation. At least one of the treatment fluid and a postflush fluid introduced after the treatment fluid may have a pH of about 4 or more in some applications.

In another aspect, provided herein is a method of treating a subterranean formation penetrated by a wellbore, the method comprising: forming a treatment fluid comprising an aqueous carrier fluid, a proppant and a water-insoluble solid-form polysuccinimide homopolymer or copolymer capable of hydrolyzing to form polyaspartate and/or polyaspartic acids, wherein the polysuccinimide is of renewable or non-petrochemical origin; introducing the treatment fluid into the formation through the wellbore; allowing the polysuccinimide to hydrolyze over time and become water-soluble; and providing scale inhibition over time in formation and within proppant.

In one embodiment, the polysuccinimide has a particle size of about 0.15 mm or less. In another embodiment, the treatment fluid further comprises a viscosifying agent. In another embodiment, the polysuccinimide is in the form of at least one of particles, fibers, beads, films, ribbons, rods, elongated bodies and platelets. In another embodiment, the treatment fluid is introduced into the formation at a pressure above the fracture pressure of the formation. In another embodiment, the treatment fluid further comprises a formation-dissolving agent capable of dissolving materials of the formation. In another embodiment, at least one of the treatment fluid and a postflush fluid introduced after the treatment fluid has a pH of about 4 or more. In another embodiment, the polysuccinimide is present within the treatment fluid in an amount of from about 20% by weight or less. In another embodiment, the treatment fluid contains substantially no fatty acids or fatty acid derivatives. In another embodiment, the treatment fluid further comprises hydrochloric acid, hydrofluoric acid, sources of hydrogen fluoride, fluoboric acid, boric acid, nitric acid, hydroiodic acid, hydrobromic acid, sulfuric acid, sulfamic acid, phosphoric acid, formic acid, acetic acid, halogenated derivatives of acetic acid, citric acid, propionic acid, tartaric acid, lactic acid, glycolic acid, aminopolycarboxylic acids, sulfamic acid, phosphonate acids and esters thereof, malic acid, maleic acid, methylsulfamic acid, methanesulfonic acid, chloroacetic acid, 3-hydroxypropionic acid, polyaminopolycarboxylic acid derivatives, polycarboxylate derivatives, and combinations of these acids and/or their salts. In another embodiment, at least one of the treatment fluid and a postflush fluid introduced after the treatment fluid has a pH of about 4 or more.

In another aspect, provided herein is a method of treating a sandstone-containing formation penetrated by a wellbore, the method comprising: forming a treatment fluid comprising an aqueous solution containing a hydrogen fluoride source, ammonium hydroxide and at least one of a polysuccinimide and a polyaspartic acid or a salt thereof of renewable or non-petrochemical origin; wherein the ammonium hydroxide and the polysuccinimide are mixed together prior to addition of the hydrogen fluoride source to facilitate degradation of the at least one of polysuccinimide, polyaspartic acid, or salt thereof, to form an aqueous polycarboxylate solution, the treatment fluid comprising the aqueous polycarboxylate solution and the hydrogen fluoride source; and introducing the treatment fluid into the formation through the wellbore.

In one embodiment, the hydrogen fluoride source is selected from hydrofluoric acid, ammonium fluoride, ammonium bifluoride, fluoroboric acid, hexafluorophosphoric acid, difluorophosphoric acid, fluorosulfonic acid, polyvinylammonium fluoride, polyvinylpyridinium fluoride, pyridinium fluoride, imidazolium fluoride, sodium tetrafluoroborate, ammonium tetrafluoroborate, salts of hexafluoroantimony, polytetrafluoroethylene polymers, and combinations of these. In another embodiment, the treatment fluid further comprises hydrochloric acid, nitric acid, hydroiodic acid, hydrobromic acid, sulfuric acid, sulfamic acid, phosphoric acid, formic acid, acetic acid, halogenated derivatives of acetic acid, citric acid, propionic acid, tartaric acid, lactic acid, glycolic acid, aminopolycarboxylic acids, sulfamic acid, phosphonate acids and esters thereof, malic acid, maleic acid, methylsulfamic acid, methanesulfonic acid, chloroacetic acid, 3-hydroxypropionic acid, polyaminopolycarboxylic acid derivatives, polycarboxylate derivatives, and combinations of these acids and/or their salts.

Dispersants/Milling Agents

In another aspect, provided herein are methods and compositions comprising polysuccinimide, polyaspartic acid or a salt thereof or renewable or non-petrochemical origin as a milling agent, whereby one can obtain aqueous suspensions of finely divided mineral materials of high concentration in such materials, such that the minerals do not settle, and the suspensions are pumpable and contain biodegradable milling agents.

In some embodiments, the polyaspartic acid salts are used as agents for dispersing materials such as calcium carbonate.

In some embodiments, the polyaspartic acids utilized have weight average molecular weight in the range of 3500-25,000, preferably in the range of 4000-10,000, particularly preferably in the range of 5300-8000.

In some embodiments, provided herein are methods for using polysuccinimides or salts of polyaspartic acids as milling agents in the preparation of aqueous suspensions of mineral substances, which suspensions are pumpable, non-sedimenting, highly concentrated in the mineral materials, and of fine particle size; in particular with particle sizes as fine as possible, for example with median diameter less than 3 micron, and preferably with median diameter less than 1 micron; and the suspensions having Brookfield viscosity which increases only slightly over time, i.e. wherewith even after storage for a number of days (or even weeks) in tanks without agitation the viscosity is sufficiently low to permit easy handling by the user.

In one embodiment, provided herein is a method of milling of mineral particles in aqueous suspension, with the use of salts of polyaspartic acids as milling agents. In another embodiment, provided herein are aqueous suspensions of finely divided minerals and polyaspartic acid or salts thereof, which suspensions are non-sedimenting, pumpable, and highly concentrated in the mineral substances.

In one aspect, provided herein is a method for comminuting an aqueous suspension of coarse mineral material comprising: (a) preparing an aqueous suspension containing a coarse mineral material and a milling agent, wherein the milling agent comprises a salt of polyaspartic acid of renewable or non-petrochemical origin preferably having a weight average molecular weight of 35,000 to 25,000; (b) adding a milling body to the aqueous suspension, thereby preparing a mixture; and (c) milling the mixture to obtain particles having a median diameter preferably less than 1 micron.

In one embodiment, the milling agent comprises a mixture of polyaspartic acid or a salt thereof and a polysuccinimide. In another embodiment, the milling agent is a solution or a powder. In another embodiment, the ratio of the dry weight of the milling agent to the dry weight of the mineral material is from 0.2 wt % to 2 wt. %. In another embodiment, the aqueous suspension has a dry matter content of 70 wt. %.

In another aspect, provided herein is an aqueous suspension containing a comminuted mineral material, wherein the aqueous suspension is prepared by the method provided herein. In one embodiment, the comminuted mineral material contains natural calcium carbonate, synthetic calcium carbonate, or dolomite.

Renewable or Non-Petrochemical Based Aspartic Acid

Aspartic acid, employed to prepare polysuccinimide and polyaspartate utilized herein is obtained from recombinant host cells capable of producing aspartic acid such as L-aspartic acid or a salt thereof under substantially anaerobic conditions. The host cell comprises one or more heterologous nucleic acids encoding an L-aspartate pathway enzyme. In one embodiment, the recombinant host cell is engineered to produce L-aspartate under substantially anaerobic conditions.

Any suitable host cell may be used to produce aspartic acid, and non-limiting examples of host cells include archaeal, prokaryotic, or eukaryotic cells. In one embodiment, the recombinant host cell is a yeast cell. In certain embodiments, the recombinant yeast cells are engineered by the introduction of one or more genetic modifications (including, for example, heterologous nucleic acids encoding enzymes and/or disruption or deletion of native enzyme-encoding nucleic acids) into a Crabtree-negative yeast cell. In certain of these embodiments, the host cell belongs to the *Pichia/Issatchenkia*/Saturnispora/Dekkera clade. In certain of these embodiments, the host cell belongs to the genus selected from the group consisting of *Pichia, Issatchenkia*, or *Candida*. In certain embodiments, the host cell belongs to the genus *Pichia*, and in some of these embodiments the host cell is *Pichia kudriavzevii.*

In certain embodiments the recombinant host cells have at least one active L-aspartate pathway from phosphoenolpyruvate or pyruvate to L-aspartate. In certain embodiments, the recombinant host cells have an L-aspartate pathway that proceeds via phosphoenolpyruvate or pyruvate, and oxaloacetate intermediates. In many embodiments, the recombinant host cell comprises one or more heterologous nucleic acids encoding one or more L-aspartate pathway enzymes selected from the group consisting of phosphoenolpyruvate carboxylase, pyruvate carboxylase, phosphoenolpyruvate carboxykinase, and L-aspartate dehydrogenase wherein the heterologous nucleic acid is expressed in sufficient amounts to produce L-aspartate under substantially anaerobic conditions. In other embodiments, the recombinant host cell comprises one or more heterologous nucleic acids encoding one or more L-aspartate pathway enzymes selected from the group consisting of phosphoenolpyruvate carboxylase, pyruvate carboxylase, phosphoenolpyruvate carboxykinase, and L-aspartate dehydrogenase wherein the heterologous nucleic acid is expressed in sufficient amounts to produce L-aspartate under aerobic conditions. In one embodiment, the recombinant host cell comprises one or more heterologous nucleic acids encoding one or more L-aspartate pathway enzymes selected from the group consisting of pyruvate carboxylase and L-aspartate dehydrogenase, wherein the heterologous nucleic acid is expressed in sufficient amounts to produce L-aspartate under substantially anaerobic conditions. In one embodiment, the recombinant host cell comprises one or more heterologous nucleic acids encoding one or more L-aspartate pathway enzymes selected from the group consisting of pyruvate carboxylase and L-aspartate dehydrogenase wherein the heterologous nucleic acid is expressed in sufficient amounts to produce L-aspartate under aerobic conditions.

In some embodiments, the recombinant host cell comprises a heterologous nucleic acid encoding an L-aspartate dehydrogenase. In certain embodiments, the recombinant host cell comprises a heterologous nucleic acid encoding *Pseudomonas aeruginosa* L-aspartate dehydrogenase and is capable of producing L-aspartate (see, US 2022/0119821, supra). In other embodiments, the recombinant host cell comprises a heterologous nucleic acid encoding *Cupriavidus taiwanensis* L-aspartate dehydrogenase and is capable of producing L-aspartate (see, US 2022/0119821, supra).

In various embodiments, L-aspartate dehydrogenase enzymes suitable for use in accordance with the methods of this disclosure have L-aspartate dehydrogenase activity (see, US 2022/0119821, supra). In various embodiments, L-aspartate 1-decarboxylase enzymes suitable for use in accordance with the methods of this disclosure have L-aspartate 1-decarboxylase activity (see, US 2022/0119821, supra).

The host cells are genetically modified to delete or otherwise reduce the activity of endogenous proteins. Deletion or disruption of ethanol fermentation pathway(s) and nucleic acids encoding ethanol fermentation pathway enzymes is useful for engineering a recombinant host cell capable of efficient production of L-aspartate under substantially anaerobic conditions. In various embodiments, recombinant host cells comprising deletion or disruption of one or more nucleic acids encoding ethanol fermentation pathway enzymes decreases ethanol production by at least 55%, at least 60%, at least 70%, at least 90%, at least 95%, or at least 99% as compared to parental cells that do not comprise this genetic modification.

In various embodiments, the recombinant host cells comprise a deletion or disruption of one or more nucleic acids encoding an enzyme selected from the group consisting of pyruvate decarboxylase, alcohol dehydrogenase, and/or malate dehydrogenase.

In certain embodiments, a recombinant host cell described herein is cultured in a medium containing at least one carbon source and one nitrogen source under substantially anaerobic conditions such that L-aspartate is produced. In various embodiments, conditions are selected to produce an oxygen uptake rate of around 0-25 mmol/l/hr. In some embodiments, conditions are selected to produce an oxygen uptake rate of around 2.5-15 mmol/l/hr. In other embodiments, a recombinant host cell described herein is cultured in a medium containing at least one carbon source and one nitrogen source under aerobic conditions such that L-aspartate is produced.

EXAMPLES

Example 1: Polysuccinimide Preparation

In this example, 506 grams of renewable, non-petrochemical based L-aspartic acid obtained by fermentation is spread evenly on a rectangular glass tray and placed in a muffle furnace at 240° C. for seven hours. About once per hour, the tray is removed, the contents are stirred with a spatula and the tray is replaced in the muffle furnace. A tan-colored powder, is formed. The identity of this powder is confirmed by $^{1}$H NMR spectroscopy. Polysuccinimides of other weight average molecular weights can be obtained by heating at higher or lower temperatures and/or for longer or shorter periods of time.

Example 2: Polyaspartic Acid Preparation

In this example, 750 milliliters of 2N aqueous sodium hydroxide is added dropwise to 175 grams of renewable polysuccinimide such that the pH does not go above 10 while maintaining the mixture at 50-60° C. After the addition of the sodium hydroxide is complete, the mixture is maintained at 50-60° C. for one hour. After one hour, the pH is adjusted to 9 by the dropwise addition of 1N aqueous hydrogen chloride. The polyaspartic acid is lyophilized and identified by $^1H$ NMR spectroscopy. The Mw, is measured by aqueous GPC.

Renewable polysuccinimide and polyaspartic acid are used in the following evaluations.

Example 3: Soil Removal and Anti-Redeposition Performance Evaluation

In this example, the efficacy of polysuccinimide for clay soil removal and anti-redeposition is evaluated by washing soiled cotton and cotton/terry blended fabrics in detergent formulations.

Cotton cloth is cut to a specified size (3½"×4½"). The cloths are then soiled by applying from 0.9 to 1.1 grams of a 50% clay slurry (in water) using a bristle brush. The soil is "painted" onto the cloth inside a 2" diameter circle and allowed to air dry overnight prior to laundering. The clay used to soil the cloths is a reddish-brown particulate clay.

The detergent compositions are tested in a Tergotometer at the following conditions; 40° C., 100 rpm, 100 ppm hardness (50% tap water/50% de-ionized water), 12-minute wash with one 3-minute rinse, 1300 ppm detergent and 5 cloths per pot (3 of them soiled). The wash water is pre-heated, the fabric swatches are added and then dissolved detergent containing polysuccinimide/polyaspartic acid (2.6 grams of a 50% slurry in 100 milliliters water) is added. Following the wash period, the swatches are wrung, and following the rinse cycle the swatches are wrung again and then air dried. Swatches washed in a detergent containing no polyaspartic acid or salt thereof are always run as a control.

Reflectance is measured using a colorimeter and the data recorded using the L,a,b color scale. Detergency values (E), a measure of soil removal, and whiteness index (W.I.), a measure of anti-redeposition, are calculated as: where $L_s$, $a_s$, and $b_s$ are the reflectivity reading for the soiled swatches and L,a,b are the reflectivity readings for the washed swatches. Each polymer is evaluated in three separate washing experiments. The reflectance of the soiled cloths is measured before laundering so that cloths of the same reflectance are used in a test. Reflectance is then measured after laundering to evaluate the efficacy of the polysuccinimide in the detergent.

Example 4: Liquid Slow-Release Nitrogen Fertilizer

In this example, a liquid slow-release nitrogen fertilizer in accordance with the present disclosure is prepared as follows. 50 gallons of a liquid urea formaldehyde fertilizer that contains up to 32 percent nitrogen, up to 80 percent of which is water-insoluble, are added to a mixing tank. To this is added 6 quarts of sodium polyaspartate having a weight average molecular weight of 1,000 to 10,000. The desired mixture of various molecular weights is then blended at ambient temperature with a paddle blender, bypass agitation or an air system. The resulting blend is useful as a liquid slow-release reacted nitrogen fertilizer Example 5: Solid Slow-Release Nitrogen Fertilizer In this example, a solid slow-release nitrogen fertilizer in accordance with the present disclosure is prepared as follows. 100 pounds of solid urea formaldehyde are added to the hopper of a tumbling blender. 24 quarts of a polyaspartate, such as, sodium polyaspartate are also added to the blender. The sodium polyaspartate is of one or more molecular weights of up to 10,000. The mixture is blended until the sodium polyaspartate is evenly distributed on the urea formaldehyde granules. The resulting blend is useful as a solid slow-release reacted nitrogen fertilizer.

Example 6: Evaluating a Polyaspartic Acid Containing Fertilizer

In this example, a trial is conducted in a production field of mustard greens. The field is split using a standard nitrogen program of two applications of ammonium nitrate and a single pre-emergent application of a mixture of 30% by weight liquid urea formaldehyde (66%-70% nitrogen of which 60%-70% by weight is water-insoluble) and 3% by weight sodium polyaspartate. All other fertilization is preformed in the same manner across the entire field. Tillage, planting and maintenance are done in accordance with normal production practices. Data is taken by harvesting paired samples from both the treated areas. The line between the two treatments is identified in the field. Samples are taken a few rows into the plots in order to avoid cross-contamination, but close enough that the paired samples are subjected to similar growing conditions. Applications are made using large-scale production equipment. The test is repeated on fields of tomatoes, watermelons, and cantaloupe.

Example 7: Evaluating Enhanced Nutrient Uptake By a Plant

In this example, one-year-old red maple (*Acer rubrum*) seedlings are planted in 5-gallon containers using screened topsoil as the planting media. The 90 trees are weighed prior to planting and have an average weight of 23 grams at the time of plotting. The sandy loam topsoil used in the containers has a pH of 7.4, soluble salts of 0.15 and 2 ppm of Nitrate N prior to fertilization.

Nine treatments applied included combinations of Arbor Green (a 30(N)-10(P)-7(K) slow release fertilizer), two sources of organic matter (humate and kelp) and a polyaspartic acid salt. The source of humate is oxidized lignite. The product, ground to a 50 mesh, is 70% humate with an analysis of 60% humic acid and 30% fulvic acid. The source of kelp is ground to a 60 mesh. A sodium salt of polyaspartic acid is used, for example, in about 0.5% amount. The surface area of each container is 10.75 inches in diameter or 0.6 sq. ft. per pot. The study is conducted using a randomized complete block design with 10 replications per treatment.

Treatment responses are evaluated using growth, visual rating and color. Growth is evaluated by washing the soil from the root systems of the trees and calculating the percent increase in total weight during the test period. Visual Rating is evaluated using a scale of 0-5 where 5=excellent and 0=dead. Color is evaluated using a Minolta SPAD-502 Chlorophyll Meter that assigns a numerical number to the green color in leaves.

Example 8: Evaluating Polyaspartic Acid's Effect on Nutrient Usage in Corn Plants In this example, white corn is grown in a greenhouse in one-gallon pots filled with potting soil. To each pot is added a 20(N)-20(P)-20(K) fertilizer in an amount representing a full dose of nutrients or a ⅓ dose of nutrients. A portion of the pots so treated also receive an aqueous solution of polyaspartic acid (PA) (50 ml; 10 ppm by weight of PA having a molecular weight (Mw) of about 3,000-5,000. The growth rates of the white corn plants in these pots are monitored, and representative plants are photographed 40 days after planting. The availability of polyaspartic acid to the plant will enhance plant growth at a reduced nutrient level, i.e., corn plants treated at one-third of the nutrient level but with 10 ppm of polyaspartic acid added show greater growth than corn plants will the full amount of nutrient. Corn plants grown using the full nutrient level will undergo enhanced growth when, for example, 10 ppm of polyaspartic acid is used along with the nutrient.

Example 9: Synthesis of Crosslinked Polysuccinimide

In this example, polysuccinimide (about 9.78 g) is dissolved in DMSO (about 100 mL) at a temperature of about 40° C. Ethylenediamine (EDA) (about 1 g, 10 mmol) is then added with stirring over a period of about 5 minutes at a temperature of from about 45-50° C. A gelatinous reaction mixture of crosslinked polysuccinimide formed after a few minutes.

Next, the gelatinous reaction mixture is heated at a temperature of about 50° C. for about an additional 2 hours to ensure complete reaction. The gelatinous reaction mixture is then cooled to about ambient temperature. The cooled reaction mixture is poured into about 600 mL of methanol with stirring. A precipitate is produced. The product is collected by filtration and substantially dried at about 70° C.

Example 10: Super Absorbing Polymeric Networks of Renewable Polyaspartates

In this example, the super absorbing characteristics of a polymeric network of a crosslinked polyaspartate is demonstrated by the values obtained in the following protocol employing either deionized water or aqueous 1% sodium chloride (saline solution).

About 100 milligrams (mg) of polymeric network of polyaspartate is added into a pre-weighed test tube. An amount of either deionized water or saline solution is added in sufficient excess the contents of the tube to swell the polymeric network and provide supernatant liquid. The tube is then allowed to stand undisturbed for about 25 minutes, at the end of which time, the tube is centrifuged at about 1500 rpm for about 5 minutes. The supernatant liquid is then removed by pipette.

The tube with its contents is then weighed and the amount of liquid that had been absorbed by the polymeric network is determined. Water absorbency or saline absorbency is expressed as the ratio of the weight of the water swollen or saline swollen polymeric network gel divided by its weight when dry. Each evaluation is made in triplicate and an average value calculated.

Example 11: Evaluating Polyaspartic Acid Composition For Uses In Oil Well

In this example, coreflood experiments are carried out using sandstone cores 6 inches (15.24 cm) long and 1 inch (2.54 cm) in diameter in a Formation Response Tester Instrument. The core dimensions are accurately measured and dry core-mass is measured. The cores are saturated in a 5 wt % solution of ammonium chloride prior to testing, and the saturated mass is used to calculate the pore-volume. The cores are tested at 200° F. (about 93° C. C) under a confining pressure of 2000 psi (13.8 MPa) in a Viton sleeve. A backpressure of 500 psi (3.45 MPa) is used throughout the experiment to keep $CO_2$ in solution, allowing accurate measurement of the differential pressure (top to bottom) across the core. After the brine-saturated core has reached steady-state temperature, the initial permeability to 5% $NH_4Cl$ brine ($k_{ini}$) is measured separately in the production and injection directions. All brine and treatment-fluid injections are carried out using flow-rates of 5 $cm^3$/min. The treatment fluid consisted of a solution of polysuccinimide in calcium chloride brine (with a density of 1.25 $g/cm^3$). Following the treatment stage, the return permeability to 5 wt % $NH_4Cl$ is measured in the injection directions to determine the final permeability ($k_{fin}$). This stage is optionally followed by either measurement of permeability in the production direction or is shut-in at temperature followed by measurement of brine-permeability in the injection and production directions.

The invention claimed is:

1. A detergent, comprising:

about 0.5 wt %-50 wt % renewable polysuccinimide, polyaspartic acid, or a salt thereof, wherein the $^{14}C$ content of the polysuccinimide is higher than 0 parts per trillion;

up to about 50 wt % of one or more surfactants; and about 0.5 wt %-85 wt % of one or more builders.

2. The detergent composition of claim 1, wherein the one or more surfactants are present at about 5 wt %-45 wt %.

3. The detergent composition of claim 1 wherein the polysuccinimide is present at about 1 wt %-30 wt %.

4. The detergent composition of claim 1, wherein the one or more builders are selected from sodium carbonate, sodium pyrophosphate, trisodium phosphate, sodium tripolyphosphate, sodium sulfate, borax, a polycarboxylate, ethylenediaminetetraacetic acid (EDTA), nitrilotriacetic acid (NTA), a citrate, trisodium citrate, a silicate, sodium silicate, crystalline sodium disilicate, zeolite, an aminocarboxylate, methylglycindiacetic acid, glutaminic acid, gluconic acid, polyacrylic acid, diacetic acid, and combinations thereof.

5. The detergent composition of claim 1, wherein the detergent composition is a laundry detergent composition.

6. The detergent composition of claim 1, wherein the detergent composition is a dishwashing detergent composition.

* * * * *